United States Patent

[11] 3,585,302

[72] Inventor William O. Swan, Jr.
Sunnyvale, Calif.
[21] Appl. No. 799,822
[22] Filed Feb. 17, 1969
[45] Patented June 15, 1971
[73] Assignee Anderson-Jacobson Inc.
Mountain View, Calif.

[54] ACOUSTIC COUPLER
10 Claims, 4 Drawing Figs.

[52] U.S. Cl. .......... 179/1C
[51] Int. Cl. .......... H04m11/00
[50] Field of Search .......... 179/1 C, 2 C, 5 P, 178, 179

[56] References Cited

UNITED STATES PATENTS

| | | | |
|---|---|---|---|
| 2,402,341 | 6/1946 | Patterson .......... | 179/1 (C) |
| 2,528,636 | 11/1950 | Cisin .......... | 179/1 (C) |
| 2,987,575 | 6/1961 | Chalfin .......... | 179/1 (C) |
| 3,319,003 | 5/1967 | Prager .......... | 179/1 (C) |
| 3,449,522 | 6/1969 | Crane et al. .......... | 179/1 (C) |

OTHER REFERENCES

Bring A Computer to Your Telephone With the Anderson Jacobson Model ADT-233; Sales & Advertisement Publication of Assignee; date of publication unknown.

*Primary Examiner*—Kathleen H. Claffy
*Assistant Examiner*—Horst F. Brauner
*Attorney*—Lindenberg & Freilich

ABSTRACT: Apparatus is disclosed for acoustically coupling a telephone to a data terminal for the purpose of transmitting or receiving messages, where the telephone handset is placed on a bracket mounted directly on the chassis of the terminal. Isolation of transmitting and receiving acoustic links is provided by a pair of resilient cups, one for each link. The inside contour of each cup is adapted to provide a supporting annular ledge for one end of the telephone and an airtight seal over the transducer thereof. An annular recess below the ledge is formed to receive and tightly hold a flange of a receiving or transmitting transducer. Each cup is mounted on the bracket by a resilient flange. The flange is connected to the cup by a sleeve which is turned in at the top to form an inverted auxiliary cup with the base of the main cup protruding through the bottom of the auxiliary cup. In that manner, virtually complete acoustic isolation is provided by the cup from the surrounding air and bracket.

INVENTOR.
WILLIAM O. SWAN, JR.
BY Lindenberg & Freilich
ATTORNEYS

WILLIAM O. SWAN, JR
INVENTOR.

BY Lindenberg & Freilich

ATTORNEYS

ACOUSTIC COUPLER

BACKGROUND OF THE INVENTION

This invention relates to an acoustically coupled data terminal, and more particularly to an improved assembly for acoustically coupling a telephone to apparatus for the purpose of transmitting or receiving messages.

It is often desirable to link one electronic system with another at a remote side, such as a teletypewriter to a data processing system. At first it was necessary to link the data processing system to the teletypewriter by a permanent telephone line connection at some rental cost. Aside from the cost of renting the line, the permanent connection had the obvious disadvantage that it was then not possible to move the teletypewriter from one location to another without incurring a reconnection charge. Later it became possible to couple a teletypewriter acoustically to any telephone through a coupling unit so that the teletypewriter could be moved to any location having a telephone.

For a remote terminal to make a telephone connection to a computer through a coupling unit, the telephone handset is lifted from its cradle and placed on a bracket in the coupling unit. The bracket is generally provided with cushioned cups around the transducer (microphone and speaker) to eliminate noise from the room. Thus, once the computer has been dialed in the usual way, the remote terminal is acoustically linked to it. Digital data are converted into coded tones by the coupling unit in response to electrical signals from the transmitting end and then reconverted into electrical signals at the receiving end.

The development of acoustic coupling units has added greatly to the flexibility of a remote data terminal in a system. As a consequence, teletypewriters have become very portable.

Where there are significant mechanical operations being carried out at the remote terminal during communication, such as operations of typewriter keys and hammers in a teletypewriter, an acoustical link does present some rather obvious noise problems. To eliminate those problems, it has been necessary to provide the acoustic coupling unit on a separate chassis. The unit is in turn connected to the teletypewriter through only a flexible line.

It would be desirable to mount the coupling unit and telephone handset bracket on the same chassis as the remote terminal equipment for even greater portability. A portable teletypewriter, for example, would then consist of but one compact unit, instead of two as at present. However, attempts to do so have been met with serious noise problems due to transmission of sound waves through the bracket to the receiving transducers (microphones of the telephone handset and of the acoustic coupler). The problem has been that of providing acoustic isolation of the transducers from the telephone handset bracket when the bracket is mounted directly on the teletypewriter chassis in addition to isolation from the surrounding room.

SUMMARY OF THE INVENTION

According to the invention, a bracket for a telephone handset is mounted directly on the chassis or some integral part of terminal equipment for remote communication with a system through a coupling unit. For acoustic isolation, two resilient cups are mounted on the bracket, one for the telephone transmitter and one for the telephone receiver. The cups are formed to receive the ends of the handset with an airtight fit for isolation from the surrounding air. A microphone is mounted within the cup intended for the telephone transmitter and a speaker is mounted within the cup intended for the telephone receiver. Both transducers are so mounted as to be securely held inside their respective cups by sidewalls which extend upwardly away from the bracket. Electrical connections from the coupling unit to those transducers are made by conductive wires through tight holes in the cups behind the transducers while mechanical connections of the cups to the bracket are made by resilient flanges on the cups. In that manner, the acoustic link between the telephone handset and the coupling unit is established without soundwaves being transmitted from the terminal equipment to the handset through the bracket.

In accordance with a further feature of the present invention, the flange of each cup is connected thereto by a sleeve of resilient material forming an inverted auxiliary cup in order that the axis of the main cup may be free to move in any direction as a result of shock or soundwaves passing through the mounting bracket.

Each cup is provided with an internal ledge of resilient material to space the handset away from a transducer in the cup. In a preferred embodiment, an annular recess just below the ledge receives an annular flange around the transducer (microphone or speaker) to hold the transducer in the cup from the bottom wall of the cup, thereby providing an airtight chamber between the transducer and the bottom wall of the cup.

DESCRIPTION OF THE PREFERRED EMBODIMENTS

Figures 1, 2:
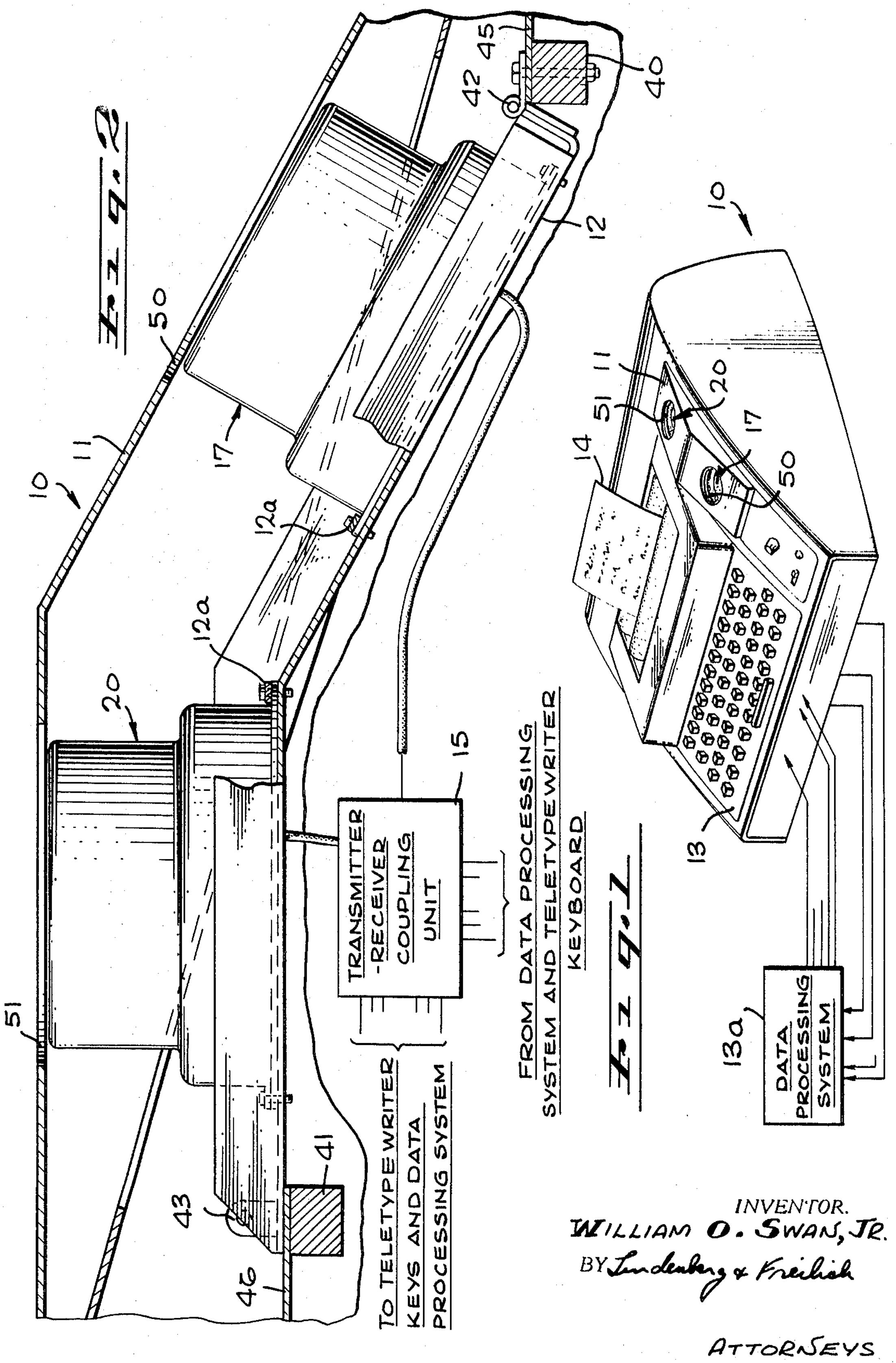
FIG. 1 is a combined perspective view and block diagram representation of a teletypewriter embodying the present invention.
FIG. 2 is a side view partially in section of a portion of the teletypewriter of FIG. 1 showing a bracket for holding a telephone handset in accordance with the present invention.

In a preferred embodiment of the invention as shown in FIG. 1, a portable teletypewriter 10 is shown in perspective with a cover 11 over bracket 12 (FIG. 2) which is adapted to hold a telephone handset (not shown in FIGS. 1 and 2). The teletypewriter may be operated in the transmitting mode either manually through a keyboard 13 or electronically by coded signals from an eternal data processing system **13*a*. Various output conductors from the data system 13*a* are connected internally to decoding and controlling circuits of the teletypewriter 10 to provide a record on a sheet of paper 14 of the data being transmitted. Conductors are also connected internally to a transmitter-receiver coupling unit 15 (FIG. 2) which converts the coded signals of the teletypewriter into a set of coded frequency signals that a speaker 16 (FIG. 3) in a cup 17 uses to supply acoustic power to the surrounding air in the form of coded tones. Thus, for the teletypewriter 10 to function as a terminal to transmit data to a processing system at a remote location via a telephone line, an operator at the location of the data terminal dials the remote system's telephone number and places the handset of the telephone from which he is dialing on the bracket 12 with the microphone end (mouth piece) 18 in the cup 17 as shown by the dotted outline in FIG. 3. The other end (ear piece) 19 of the handset is placed in a cup 20 also mounted on the bracket 12** in a similar manner.

Figure 4:
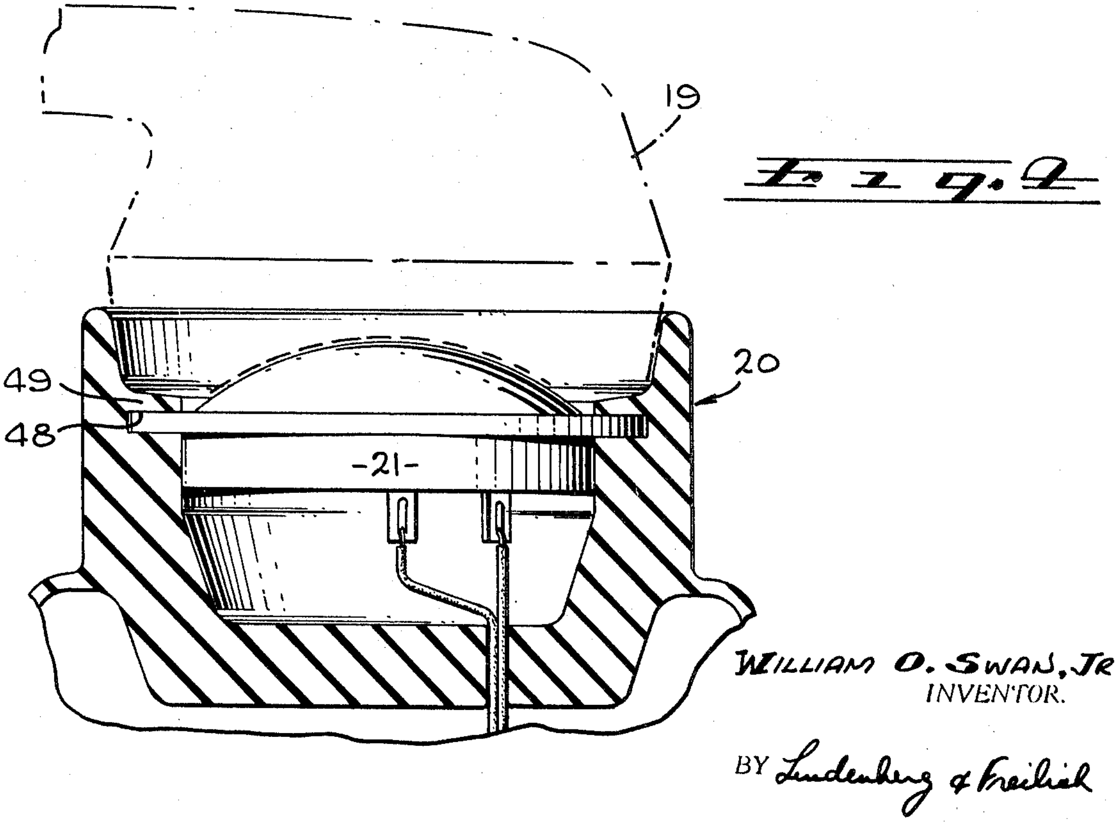
FIG. 4 is a sectional view of a portion of a resilient cup and a microphone adapted to be mounted on a bracket in the same manner as the cup of FIG. 3.

To receive data via a telephone line, the handset of the telephone is placed on the bracket 12 as before with the ear piece 19 over a microphone 21 (FIG. 4). A speaker in the ear piece 19 converts coded frequency signals being received into acoustic power in the form of coded tones. The microphone 21 reconverts the coded tones into electrical frequency signals to be detected by the transmitter-receiver coupling unit 15 and used by the teletypewriter to produce a record on the sheet 14. The data received may also be used or stored in the data processing system **13*a* at the location of the teletypewriter. Thus, the bracket 12 and cups 17 and 20 an acoustic link for transmission of data between the coupling unit 15** and the telephone handset in either direction.

Figure 3:
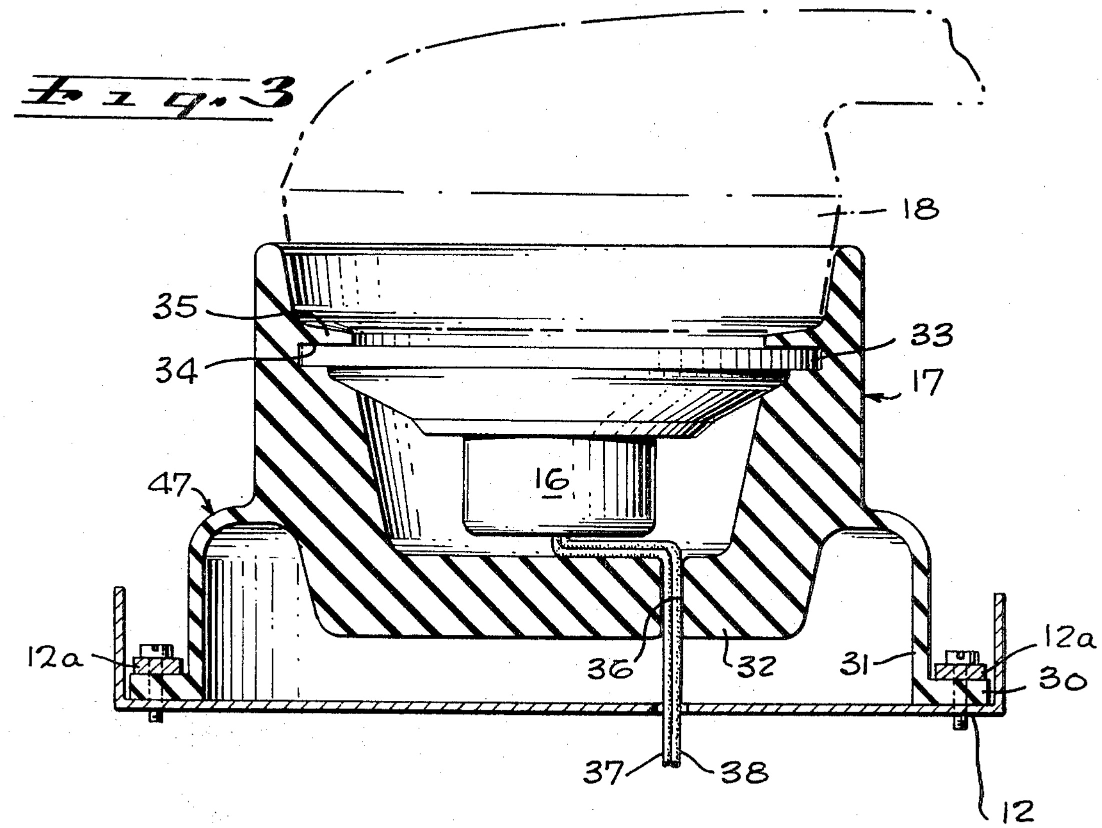
FIG. 3 is a sectional view of a resilient cup and speaker mounted on the bracket of FIG. 2.

Referring now to FIG. 3, the resilient cup 17 is provided with an integral resilient flange 30 through which a permanent connection is made to the bracket 12 using suitable cement or a clamping member 12*a* in the form of a ring or a pair of half rings riveted or screwed onto the bracket 12. The outside contour of the cup 17 is substantially cylindrical from the mouth thereof down to a line where connection is made to the flange 30 by an integral resilient sleeve 31 forming an inverted cup. The bottom wall 32 of the cup 17 protrudes into the inverted cup formed by the sleeve 31 for the purpose of providing sufficient depth for the speaker 16, and for limiting downward travel of the assembly during insertion of the telephone handset.

The inside contour of the cup 17 is determined primarily by the contour of the speaker 16, particularly a flange 33 of the speaker 16. Thus, an annular recess 34 is provided to hold the speaker 16 away from the bottom wall 32. An integral resilient annular ledge 35 is provided over the recess 34 to not only hold the speaker 16 in the cup 17 but also to space the microphone end 18 of the telephone handset away from the speaker 16 a predetermined minimum distance. The internal contour of the cup 17 around the mouth thereof assists in supporting the microphone end 18 away from the speaker 16 and, more importantly provides a substantially airtight (acoustic) seal between the microphone end 18 of the telephone handset and the speaker 16.

A hole 36 in the bottom wall 32 of the cup 17 is provided to pass insulated electrical leads 37 and 38 from the speaker 16 to the coupling unit 15 (FIG. 2). The fit around those leads 37 and 38 is so tight as to provide an airtight seal. A suitable cement may be poured around the leads to assure such a seal. In that manner an airtight seal is provided between the inside of the cup 17 and its surrounding environment, namely the housing of the teletypewriter 10. However, it is evident that only an acoustic seal is sought, and not necessarily an airtight seal since acoustic isolation may nevertheless be achieved even though there be some slight leakage of air.

The walls of the cup 17 are sufficiently thick to prevent sound waves transmitted through the air from affecting or actuating the microphone in the end 18 of the telephone handset. Acoustic cushions similar in nature have been provided for that purpose in prior art coupling units, but only in units of the type having a mounting bracket on its own separate chassis which is in turn acoustically isolated from the teletypewriter, either by providing a separate stand for it or, for greater portability, nesting it with the teletypewriter on the same stand with some acoustic cushioning material around the entire coupling unit.

In contrast to the prior art, the bracket 12 for the telephone handset is mounted directly on the chassis of teletypewriter 10 through, for example, frame members 40 and 41 shown in FIG. 2. The bracket 12 is connected to the frame member 40 by a hinge 42 in order to gain ready access to the area beneath the bracket 12 where some or all of the electronic circuits of the coupling unit may be mounted. The other end of the bracket 12 is held in position by a latching element 43 of any type, such as the type having a spring loaded detent which yields to a slight force applied to the bracket 12 in a direction away from the frame element 41. It should be noted that although the frame elements 40 and 41 are shown with sheets 45 and 46 over them, in practice the sheets may be omitted or provided as the sole support elements for the bracket 12, in which case the frame elements 40 and 41 are not required for support.

Acoustic isolation of the bracket 12 from the microphone in the end 18 of the telephone handset (placed in the cup 17 as shown in FIG. 3) is provided by the flange mounting of the cup 17 on the bracket 12. Since the flange 30 is made of the same resilient material as the cup 17 (preferably neoprene because of its durable qualities when exposed to the atmosphere over a long period of time), acoustic soundwaves generated by mechanical operations of the teletypewriter 10 are not transmitted by the supporting elements 40 and 42 to the cup 17, and much less to the microphone of the telephone handset.

To enhance the acoustic isolation provided by the flange 30, connection to the cup 17 is made through the sleeve 31 which, as noted hereinbefore, forms an inverted cup with the bottom wall 32 protruding into it. The thickness of the sleeve 31 is thin, as compared to the walls of the cup 17, in order to provide maximum flexibility. The sleeve 31 may move in any direction on the bracket 12 in response to any shock wave or high amplitude sound wave being transmitted through the bracket 12.

The diameter of the sleeve 31 is selected to be large as compared to the outside diameter of the cup 17 so that a larger inverted cup may be formed to support the cup 17. To accomplish that, the sleeve 31 is turned in at the upper end with a radius at the turn sufficient to cause the sleeve to meet the wall of the cup 17 substantially perpendicularly. The turned-in portion 47 of the sleeve 31 then constitutes the bottom of the inverted cup through which the bottom wall 32 of the cup 17 protrudes. That portion 47 may be aptly described as a "floating" flange for support of the cup 17. To enhance the flexibility of it, the cup 17 is undercut below the line of connection with it. In that manner, the "floating" flange (portion 47) allows the axis of the cup to pivot or move in any direction, including both axial directions, in response to shock or sound waves, thereby isolating the acoustic link between the speaker 16 and the microphone end 18 of the telephone handset from virtually all soundwaves being transmitted by the bracket 12, particularly sound waves of a frequency and amplitude sufficiently high to interfere with the tones of the coded signals being transmitted.

Referring now to FIG. 4, the acoustic link illustrated there is between a speaker in the other end 19 of the telephone handset and a microphone 21 mounted in the cup 20. The outside contour of the cup 20 is the same as of the cup 17 (as suggested by the dotted lines in FIG. 2) so that the description and operation of the cup 20 is the same as for the cup 17. The only difference is that the acoustic link is for receiving, rather than transmitting; therefore, the internal contour is adapted to receive the microphone 21 with its flange in a recess 48 below a ledge 49. The contour of the cup 20 above the ledge 49 provides a substantially airtight seal for the acoustic link comprising the air space between the microphone 21 and speaker end 19 of the telephone handset.

It should be noted that the cover 11 (FIG. 2) for the mounting bracket 12 is provided with holes 50 and 51, each with a diameter sufficiently large to prevent the cover 11 from interferring with the acoustic isolation provided by the resilient cups 17 and 20, and the resilient support of those cups on the bracket 12. The cover 11 may, of course, be omitted since it is included on the teletypewriter 10 for its aesthetic value only. Other modifications and variations may readily occur to those skilled in the art. Consequently, it is not intended that the scope of the invention be determined by the particular embodiment of the invention illustrated and described, but only by the true spirit and scope of the appended claims.

What I claim is:

1. Apparatus for acoustically coupling a telephone to a data terminal for the purpose of transmitting or receiving messages via a data coupling unit, comprising:

a bracket for holding a telephone handset, said bracket being mounted directly on the chassis of said terminal or some integral part thereof;

a pair of resilient cups, one cup for each end of said handset, the inside contour of a given cup being adapted to provide support for one end of said handset and to provide an acoustic seal over the telephone transducer thereof, each cup having an eternal flange attached to said bracket, said flange of a given one of said cups being connected thereto by a resilient sleeve turned in at the top for connection to the outside of said given one of said cups, thereby forming an inverted auxiliary cup to allow the axis of said given one of said cups to be free to move in any direction as a result of shock or sound waves; and a complementary pair of transducers, each secured inside a different one of said cups, a given transducer being electrically connected to said coupling unit by leads passing through a wall of said given one of said cups.

2. Apparatus as defined in claim 1 wherein said given cup, flange and sleeve are formed of the same resilient material.

3. Apparatus as defined in claim 1 wherein said given cup is provided with an internal ledge of resilient material to space the end of the telephone handset away from said transducer therein.

4. Apparatus as defined in claim 3 wherein said given cup, flange, sleeve and internal ledge are all formed of the same resilient material as an integral unit.

5. Apparatus as defined in claim 1 wherein the diameter of said sleeve is selected to be sufficiently large as compared to the outside diameter of said given one of said cups so that said inverted auxiliary cup formed to support said given one of said cups may be turned in at the upper end with a radius at the turn sufficient to cause said sleeve to meet the wall of said given one of said cups perpendicularly.

6. Apparatus as defined in claim 5 wherein the base of said given one of said cups protrudes into said inverted cup formed by said sleeve for the purpose of providing sufficient depth for a given one of said transducers.

7. Apparatus as defined in claim 6 wherein the base of said given one of said cups protrudes into said inverted cup a predetermined depth for limiting downward travel of said given one of said cups toward said bracket while a telephone handset is being placed on said pair of resilient cups.

8. Apparatus for acoustically coupling at least one transducer in one end of a telephone handset to a data terminal for the purpose of transmitting or receiving messages via a data coupling unit, comprising:

a bracket for holding said telephone handset, said bracket being mounted directly on the chassis of said terminal or some integral part thereof;

a resilient cup, having thick side and bottom walls made of the same material, for receiving said one end of said telephone handset, the inside contour of said side wall of said cup being adapted to provide support for said one end of said handset and to provide on acoustic seal over the telephone transducer thereof;

a flange made of the same material as said cup connecting the outside of said cup to said bracket; and a terminal transducer inside said cup spaced away from said bottom wall and secured to said sidewall all around the inside of said cup to provide an acoustic chamber between said terminal transducer and said bottom wall, said terminal transducer being electrically connected to said coupling unit by leads passing out of said acoustic chamber through a wall of said cup.

9. Apparatus as defined in claim 8 wherein said terminal transducer has an annular flange, and said terminal transducer is secured to said sidewall through said annular flange.

10. Apparatus as defined in claim 9 wherein said annular flange of said terminal transducer is secured to said sidewall of said cup by annular recess in said sidewall adapted to receive and tightly hold said annular flange of said terminal transducer.